G. BROWN, DEC'D.
L. S. BROWN, ADMINISTRATRIX.
COFFEE DRIPPER.
APPLICATION FILED APR. 9, 1908.

1,083,900.

Patented Jan. 6, 1914.
2 SHEETS—SHEET 1.

Witnesses:
Samuel W Balch
J Bavin T Oak

Inventor,
Goodwin Brown,
by Thomas Ewing Jr.,
Attorney.

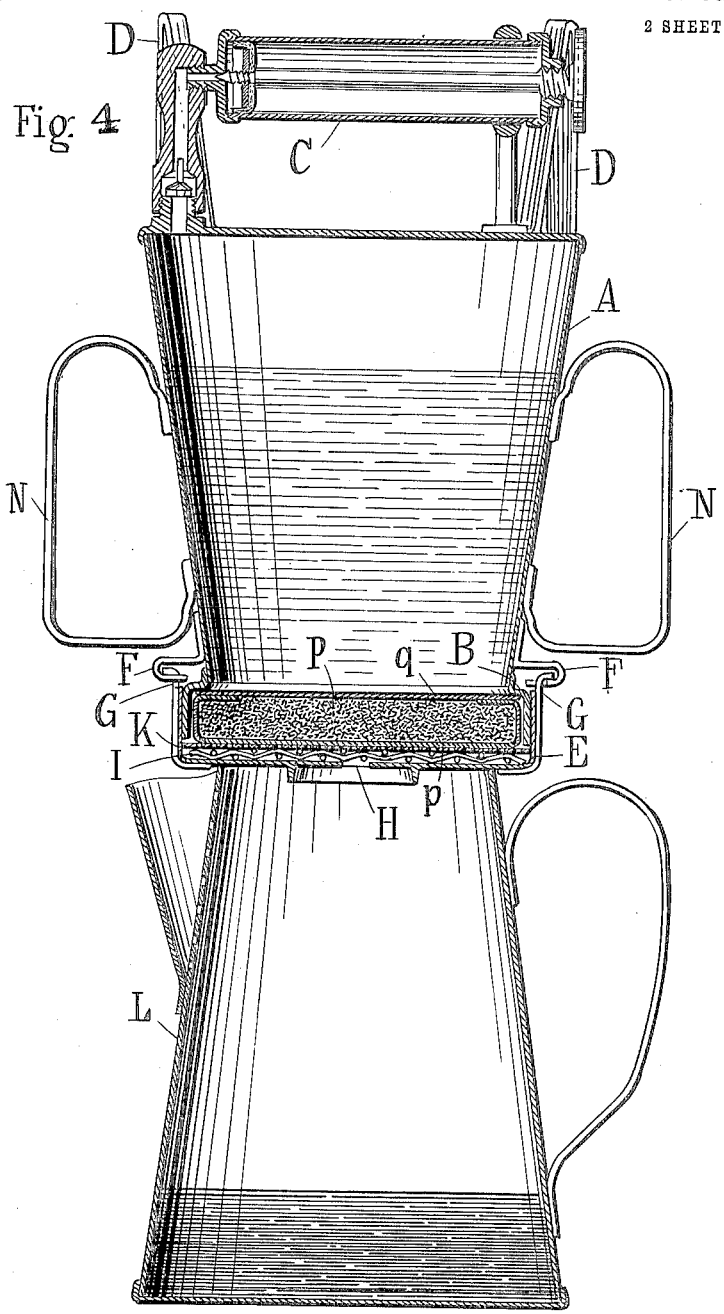

UNITED STATES PATENT OFFICE.

GOODWIN BROWN, OF YONKERS, NEW YORK; LILLIAN S. BROWN ADMINISTRATRIX OF SAID GOODWIN BROWN, DECEASED.

COFFEE-DRIPPER.

1,083,900. Specification of Letters Patent. Patented Jan. 6, 1914.

Application filed April 9, 1908. Serial No. 425,978.

*To all whom it may concern:*

Be it known that I, GOODWIN BROWN, a citizen of the United States of America, and a resident of Yonkers, county of Westchester, and State of New York, have invented certain new and useful Improvements in Coffee-Drippers, of which the following is a specification.

This invention relates to drippers for use in connection with percolating cartridges and particularly in connection with a specially prepared coffee-percolating cartridge.

The objects of my invention are to provide a dripper and a percolating cartridge suited to each other. The dripper is so constructed that a specially fitted coffee pot is unnecessary and the cartridge is so constructed that the coffee is inclosed in a filter-paper shell so treated that it will serve as a hermetically sealed packing case which will not let the essential oils of the coffee escape and become absorbed by the fibers of the inclosing shell while awaiting use.

Further objects are to construct the dripper and cartridge so that the latter forms an effective gasket to seal the mouth of the former, thereby permitting the inversion of the dripper without spilling and without coöperation of the pot into which the coffee is to be dripped.

Other objects of the invention are the prevention of the passage of water around the cartridge and compelling the passage of all water through the body of the cartridge and coffee contained therein, whereby economical and complete extraction is insured.

The dripper is simple in construction with few joints and easy accessibility for cleaning of all parts with which the coffee may be brought into contact.

Figure 1:
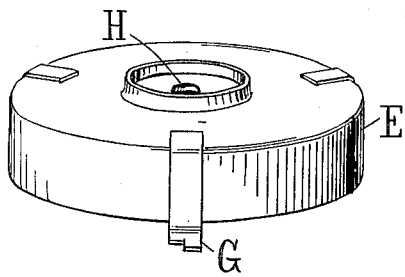
Figure 2:
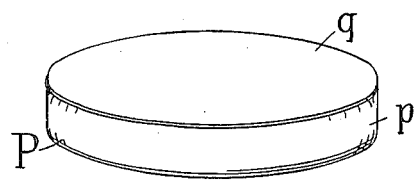
Figure 3:
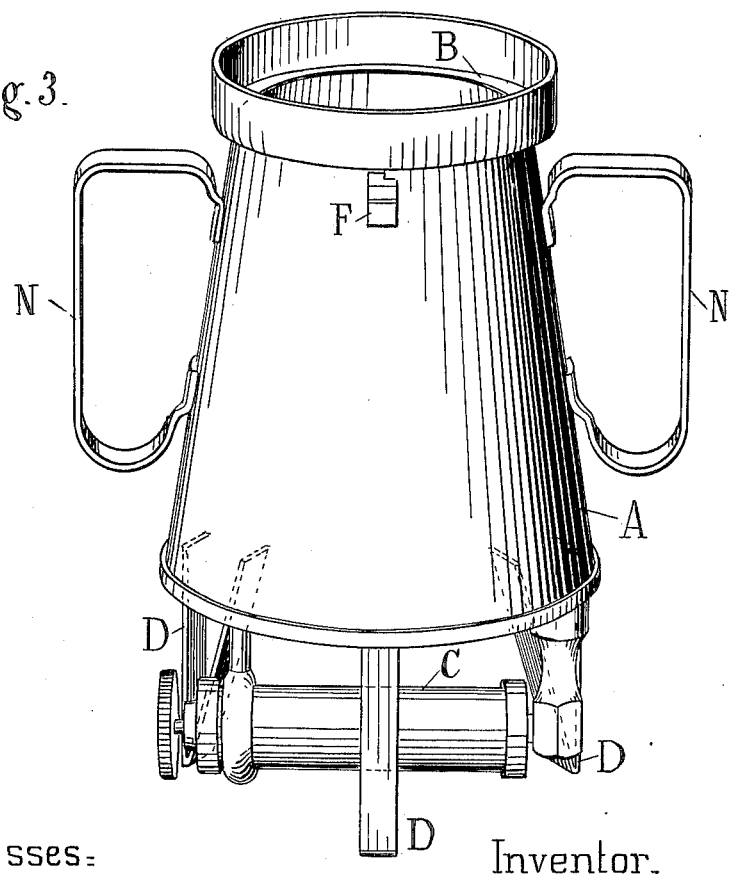

In the accompanying two sheets of drawings which form a part of this application, Figure 1 shows in perspective a cartridge clamping cap, Fig. 2 shows in perspective a percolating cartridge, and Fig. 3 shows in perspective a coffee-dripper embodying my invention. Fig. 4 is a sectional view of the same showing the cartridge in place in connection with the dripper which is inverted over a coffee-pot.

The dripper is a vessel A with an outwardly facing flange B adjacent to its mouth, the face of the flange, however, being preferably recessed back from the mouth by an amount equal to the thickness of the percolating cartridge which is to be used in connection therewith. A pressure-pump C is mounted on the bottom of the dripper. This pump serves to force air into the vessel. Legs D D extend from the bottom past the air pump and afford a means of support for the vessel so that it may be set on a level surface. A cap E closes over the mouth of the vessel, and hooks F F and G G attached to the vessel and to the cap respectively engage upon a slight rotation of the cap on the vessel mouth and lock the parts together in fixed relation. There is an opening H at the center of the cap, and disks of wire netting I and perforated metal sheet K lie within the cap. The outer face of the cap is substantially level so that the capped and inverted dripper may be placed upon and supported by the mouth of any receiving vessel L, the mouth diameter of which is not more than that of the cap. Or the dripper may be supported over the mouth of a still larger pot by resting it upon the horizontal branches of the projecting handles N N.

The cap, when locked to the vessel, is spaced from the flange at the mouth and engages a coffee-percolating cartridge P of proper diameter and thickness to fit the recess formed at the mouth of the vessel. The cap clamps the cartridge against the face of the flange of the vessel so that the cartridge will act as a gasket to hermetically close the mouth of the vessel. The cartridge consists of a filter-paper shell filled with coffee which has been roasted and finely ground or powdered. It is in the form of a round disk. One sheet of paper *p* forms the bottom and sides, and has its edges turned over the top. A second circular sheet *q*, about the same diameter as the cartridge, is pasted to the turned over edges of the first sheet, thereby fully inclosing the coffee. The second sheet is preferably quite thin so that it will be more readily penetrated by the water. Since the shell is employed as a carrier for the coffee from the time when put up by the manufacturer until required for use, it is necessary to apply to the paper of the shell a suitable coating soluble in hot water but non-absorbent, in its ordinary condition, of the essential oils of the coffee.

For this purpose cane sugar has been found suitable but this invention is not to be construed as limited to this material.

To use the invention, the percolating vessel is first filled with boiling water; then a coffee cartridge is inserted at the mouth with the thinner side of the cartridge toward the water and resting on the face of the flange of the vessel. The cap is then put on and locked. The percolating vessel is then turned over and placed upon the receiving vessel. No particular care need be taken to prevent spilling when turning over, for by reason of the pliability of the paper shell it readily conforms to the face of the flange, and the cartridge serves as a gasket to hold the water, and a little time is required for the water to dissolve the coating, penetrate both walls of the cartridge, and percolate through the coffee. As the coffee swells when wet, the first action is to seal the cartridge firmly against the face of the flange of the percolating vessel. After waiting a few minutes for the swelling to take place and the sealing to become effective, the pump is operated and the percolation hastened as much as may be desired. As the water intervenes between the cartridge and the air above, thereby acting as a seal against the passage of air, and the passage of water through the cartridge is much impeded, there being no other closure to the vessel through which air can leak and leakage through the valve being negligible, the vessel is hermetically sealed and the air may be raised to a considerable pressure, even as much as twenty pounds, and left to act expansively on the water while the percolation continues.

In practice I have found that it is desirable that the coffee-cartridge should seal the mouth of the coffee-dripper so perfectly that the water will stand in the dripper for an indefinite time after inversion, with practically no percolation unless sufficient pressure is applied.

What I claim as new and desire to secure by Letters Patent of the United States is:

As a new and improved article of manufacture, a coffee-dripper adapted for use with a percolating cartridge, and comprising an air tight vessel having a sealing flange adjacent to the mouth thereof, a cap locking with the vessel in fixed relation with the percolating cartridge clamped between the sealing flange of the vessel and the cap whereby the vessel is hermetically sealed, and a pump communicating with the interior of the vessel, substantially as described.

Signed by me at New York, N. Y., this 3d day of April, 1908.

GOODWIN BROWN.

Witnesses:
J. Bowie Dash,
W. H. Hurley.